(12) United States Patent
Hitchcock et al.

(10) Patent No.: US 8,602,331 B2
(45) Date of Patent: Dec. 10, 2013

(54) APPARATUS AND METHOD FOR SIZE REDUCTION

(75) Inventors: Paul Hitchcock, Illawong (AU); Wayne Pearce, Olinda (AU); Mark Pilgrim, Castle Hill (AU)

(73) Assignee: Musse Singapore Pte Ltd, Singapore (SG)

( * ) Notice: Subject to any disclaimer, the term of this patent is extended or adjusted under 35 U.S.C. 154(b) by 299 days.

(21) Appl. No.: 12/908,631

(22) Filed: Oct. 20, 2010

(65) Prior Publication Data

US 2011/0114766 A1    May 19, 2011

(30) Foreign Application Priority Data

Oct. 20, 2009  (SG) ................................ 200907041-8

(51) Int. Cl.
*B02C 11/08* (2006.01)
*B02C 19/00* (2006.01)
*B02C 23/00* (2006.01)

(52) U.S. Cl.
USPC .................................. 241/18; 241/21; 241/22

(58) Field of Classification Search
USPC ............................................... 241/18, 21, 22
See application file for complete search history.

(56) References Cited

U.S. PATENT DOCUMENTS

| | | | |
|---|---|---|---|
| 3,255,793 A | 6/1966 | Clute | |
| 4,390,131 A | 6/1983 | Pickrel | |
| 5,236,132 A | 8/1993 | Rowley, Jr. | |
| 6,530,534 B1 | 3/2003 | Farmer | |
| 6,722,594 B2 * | 4/2004 | Graham | 241/39 |
| 7,059,550 B2 * | 6/2006 | Graham et al. | 241/1 |
| 7,137,580 B2 | 11/2006 | Graham et al. | |
| 7,500,830 B2 | 3/2009 | Graham et al. | |
| 2004/0251345 A1 * | 12/2004 | Graham et al. | 241/47 |
| 2007/0014684 A1 * | 1/2007 | Case et al. | 422/4 |
| 2007/0267527 A1 * | 11/2007 | Graham et al. | 241/39 |

FOREIGN PATENT DOCUMENTS

| | | |
|---|---|---|
| WO | WO 93/19848 A1 | 10/1993 |
| WO | WO 98/35756 A1 | 8/1998 |
| WO | WO 00/24518 A1 | 5/2000 |
| WO | WO 03/006166 A1 | 1/2003 |

OTHER PUBLICATIONS

M.J. Walzak, et al., "The Use of XPS, FTIR, SEM/EDX, Contact Angle and AFM in the Characterization of Coatings." Journal of Materials Engineering and Performance, vol. 7(3), pp. 317-323, Jun. 1998.

* cited by examiner

*Primary Examiner* — Faye Francis
(74) *Attorney, Agent, or Firm* — Dickstein Shapiro LLP

(57) ABSTRACT

A method and apparatus for size reduction of a material. The method includes the steps of: feeding material through a feed assembly into a cyclone chamber, the cyclone chamber having an elongate cylindrical conduit having a frusto-conical section; adding at least one viscosity modifying agent into the cyclone chamber; and providing a cyclonic fluid stream within the cyclone chamber. The apparatus includes: a cyclone chamber having an elongate cylindrical conduit having a frusto-conical section; a device for creating a cyclonic fluid stream within the cyclone chamber, such that the frusto-conical section of the cyclone chamber terminates in an opening forming the inlet to the device; an air inlet tube in fluid connection with the cyclone chamber at the opposite end of the frusto-conical section; and a feed assembly for feeding material into the cyclone chamber.

13 Claims, 5 Drawing Sheets

APPARATUS AND METHOD FOR SIZE REDUCTION

BACKGROUND OF THE INVENTION

1. Field of the Invention

The present invention provides an apparatus and method for reducing the size of a material. The apparatus and method may also reduce moisture content of a material.

2. Description of the Related Art

There are several apparatus described for processing a material without mechanical action in order to reduce the particle size of the material. Most of these apparatus consist of an inlet tube, a cyclone chamber with an impeller fan for pulling air and the material to be processed through the system. The high pressure air stream is used to create a vortex in the cyclone chamber which entraps the material and holds it in a cyclonic suspension in which the material is fractionated.

An example of such an apparatus is described in WO 98/35756. WO 98/35756 describes a machine with a cyclonic chamber of adjustable length to tune the apparatus to achieve a standing wave at a particular harmonic frequency generated by a fan. It is stated at WO 00/24518 that the process of WO 98/35756 has a number of difficulties, the main one being that the physical processing which occurs in the cyclone chamber does not degrade all the material into the required size and as a result, undegraded material exits the chamber and hits the impeller. The force with which this occurs causes the fan to last no more than a few hours, even when constructed from the strongest of materials known to man.

SUMMARY OF THE INVENTION

The present invention seeks to address the problems above, and in particular provides improved methods and apparatus for reducing the size of a material. The present invention also provides a method and apparatus for removing moisture from a material.

According to one aspect, the present invention provides a method for size reduction of a material, the method comprising the steps of:
   feeding material through a feed assembly into a cyclone chamber, the cyclone chamber having an elongate cylindrical conduit having a frusto-conical section;
   adding at least one viscosity modifying agent into the cyclone cheater; and
   providing a cyclonic fluid stream within the cyclone chamber.

According to a particular aspect, the cyclonic fluid stream within the cyclone chamber may have a kinematic viscosity (v) of $1\times10^{-8}$ m$^2$/s$\leq$v$\leq$1$\times10^{-1}$ m$^2$/s.

According to a particular aspect, the viscosity modifying agent may be a kinematic viscosity modifying agent.

The step of adding at least one viscosity modifying agent into the cyclone chamber may be carried out before or after the step of feeding material into the cyclone chamber. Any suitable viscosity modifying agent may be added. For example, the viscosity modifying agent may be selected from the group consisting of: moist air; water; warm air; cold air; oxygen; nitrogen; argon; carbon dioxide; water-based surfactants; calcium sulphate; glass; boric oxide; calcium fluoride; aluminium oxide; and a combination thereof.

Any suitable amount of viscosity modifying agent may be added into the cyclone chamber. In particular, the viscosity modifying agent is added into the cyclone chamber such that the kinematic viscosity (v) of the cyclonic fluid stream within the cyclone chamber is $1\times10^{-8}$ m$^2$/s$\leq$v$\leq$1$\times10^{-1}$ m$^2$/s.

According to a particular aspect, the cyclonic fluid stream is provided by a device, the device being located in an opening formed at the termination of the frusto-conical section of the cyclone chamber.

The method may further comprise the step of collecting material whose size has been reduced. In particular, the average particle size of the material whose size has been reduced may be 5 nm-150 μm.

According to a second aspect, the present invention provides an apparatus for size reduction of material according to a method of a first aspect of the present invention. The apparatus may comprise:
   a cyclone chamber having an elongate cylindrical conduit having a frusto-conical section;
   a device for creating a cyclonic fluid stream within the cyclone chamber, such that the frusto-conical section of the cyclone chamber terminates in an opening forming the inlet to the device;
   an air inlet tube in fluid connection with the cyclone chamber at the opposite end of the frusto-conical section; and
   a feed assembly for feeding material into the cyclone chamber.

The feed assembly may also be for feeding at least one viscosity modifying agent.

The apparatus may further comprise a computer control system for controlling the amount of material, air, and/or viscosity modifying agent fed through the feed assembly into the cyclone chamber. The viscosity modifying agent may be a kinematic viscosity modifying agent. In particular, the computer control system is capable of monitoring the kinematic viscosity (v) of the cyclonic fluid stream within the cyclone chamber and accordingly, adjusts the amount of material, air and/or viscosity modifying agent fed through the feed assembly into the cyclone chamber.

A third aspect of the present invention is a method for size reduction of a material, the method comprising the steps of:
   feeding material through a feed assembly into a cyclone chamber, the cyclone chamber having an elongate cylindrical conduit having a frusto-conical section; and
   providing a cyclonic fluid stream within the cyclone chamber,
   wherein the cyclonic fluid stream has a kinematic viscosity (v) of $1\times10^{-8}$ m$^2$/s$\leq$v$\leq$1$\times10^{-1}$ m$^2$/s.

The method may further comprise the step of adding at least one viscosity modifying agent into the cyclone chamber. The at least one viscosity modifying agent may be a kinematic viscosity modifying agent. In particular, the step of adding at least one viscosity modifying agent into the cyclone chamber may be carried out before or after the step of feeding material into the cyclone chamber. Any suitable viscosity modifying agent may be added. For example, the viscosity modifying agent may be selected from the group consisting of: moist air; water; warm air; cold air; oxygen; nitrogen; argon; carbon dioxide; water-based surfactants; calcium sulphate; glass; boric oxide; calcium fluoride; aluminium oxide; and a combination thereof. Other examples of viscosity modifying agents include, but are not limited to, helium, sulphur dioxide, castor oil, corn starch solution, glycerine and tar. The corn starch solution may be 22 Baume corn starch solution, 24 Baume corn starch solution or 26 Baume corn starch solution.

Any suitable amount of viscosity modifying agent may be added into the cyclone chamber. According to a particular aspect, the viscosity modifying agent may be added into the cyclone chamber such that the kinematic viscosity (v) of the cyclonic fluid stream within the cyclone chamber is $1\times10^{-8}$ m$^2$/s$\leq$v$\leq$1$\times10^{-1}$ m$^2$/s. In particular, the step of adding at least one viscosity modifying agent is carried out when the kinematic viscosity (v) of the cyclonic fluid stream within the cyclone chamber is outside the range of $1\times10^{-8}$ m$^2$/s≤v≤$1\times10^{-1}$ m$^2$/s.

According to a particular aspect, the cyclonic fluid stream is provided by a device, the device being located in an opening formed at the termination of the frusto-conical section of the cyclone chamber.

The method may further comprise the step of collecting material whose size has been reduced. In particular, the average particle size of the material whose size has been reduced may be 5 nm-150 μm. Even more in particular, the average particle size of the material whose size has been reduced may be 8 nm-100 μm, 15 nm-50 μm, 25 nm-25 μm, 50 nm-10 μm, 75 nm-5 μm, 100 nm-800 nm, 150 nm-700 nm, 200 nm-600 nm, 300 nm-500 nm, 400 nm-450 nm.

Another aspect of the present invention is an apparatus for size reduction of a material according to a method of a third aspect of the present invention, the apparatus comprising:
- a cyclone chamber having an elongate cylindrical conduit having a frusto-conical section;
- a device for creating a cyclonic fluid stream within the cyclone chamber, such that the frusto-conical section of the cyclone chamber terminates in an opening forming the inlet to the device;
- an air inlet tube in fluid connection with the cyclone chamber at the opposite end of the frusto-conical section;
- a feed assembly for feeding material into the cyclone chamber; and
- a computer control system for monitoring the kinematic viscosity (v) of the cyclonic fluid stream in the cyclone chamber.

According to a particular aspect, the feed assembly may also be for feeding at least one viscosity modifying agent into the cyclone chamber. The at least one viscosity modifying agent may be a kinematic viscosity modifying agent. In particular, the computer control system is capable of monitoring the kinematic viscosity (v) of the cyclonic fluid stream within the cyclone chamber and accordingly, adjusts the amount of material, air and/or viscosity modifying agent fed through the feed assembly into the cyclone chamber.

Another aspect of the present invention is an apparatus for size reduction of a material comprising:
- a cyclone chamber having an elongate cylindrical conduit having a frusto-conical section;
- a device for creating a cyclonic fluid stream within the cyclone chamber, such that the frusto-conical section of the cyclone chamber terminates in an opening forming the inlet to the device;
- an air inlet tube in fluid connection with the cyclone chamber at the opposite end of the frusto-conical section; and
- a feed assembly for feeding material into the cyclone chamber,
- wherein the ratio of diameter of the feed assembly to diameter of the air inlet tube is 0.3-0.5.

The apparatus may further comprise a computer control system for controlling feeding material and fluid stream within the cyclone chamber.

According to another aspect, the present invention provides a method for size reduction of a material, the method comprising the steps of:
- feeding material through a feed assembly into a cyclone chamber, the cyclone chamber having an elongate cylindrical conduit having a frusto-conical section;
- providing a cyclonic fluid stream within the cyclone chamber; and
- controlling the ratio of the volume of material fed into the feed assembly to the volume of air within the cyclone chamber, wherein the ratio is ≤40%.

DETAILED DESCRIPTION OF THE INVENTION

Figure 1:
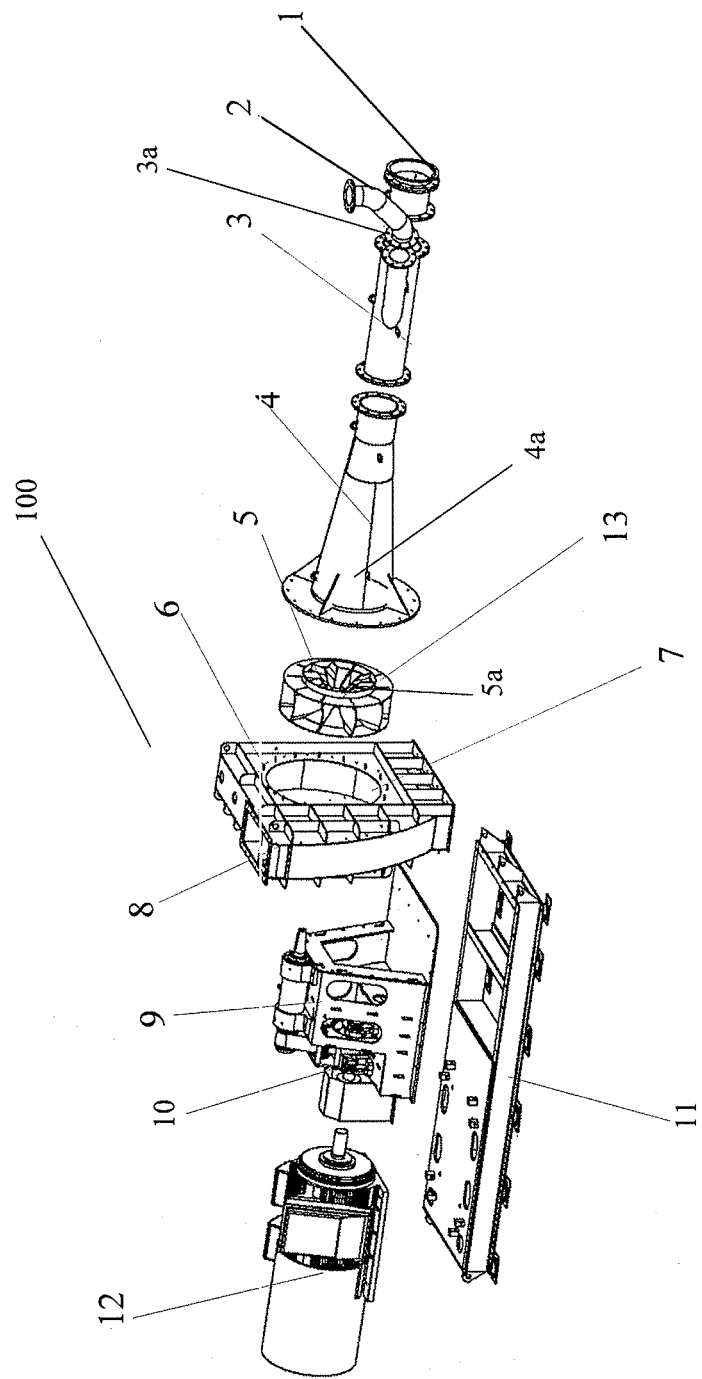
FIG. 1 shows a perspective view of an apparatus according to one embodiment of the present invention.

Bibliographic references mentioned in the present specification are for convenience listed in the form of a list of references and added at the end of the examples. The whole content of such bibliographic references is herein incorporated by reference.

A number of equipment designs and operating mechanisms are reported in the prior art, examples of which are provided above. In general, such equipment consists of a conical cyclone chamber with an impeller fan for pulling air and the material to be processed through the system. The air stream is used to create a vortex in a cyclone chamber which entraps the material, holding it in a cyclonic suspension in which it is processed to some degree. During processing, the particle size of the material may be reduced.

The fluid dynamics of a vortex-based material processing system is very complex and varies continuously throughout the process cycle. Complications may arise due to the fact that the particles of the material fed into the processing system have inertia and behave differently to the rest of the fluid within the processing system, predominantly air and water vapour, under turbulent flow conditions.

The continuous change in size and concentration of the particles of the material whose size is to be reduced and which are suspended within the fluid, along with concomitant changes in the water content within the processing system, result in a dynamic situation in which particles are forced in and out of the effective processing zone. In particular, when the material to be processed within the processing system is added to the airstream within the processing system, the fluid dynamics of the system changes dramatically and the Reynolds number changes. In order for the material to be effectively processed within the processing system, the flow conditions need to be optimised to ensure that particles are subjected to the shear forces of the vortex for as long as possible.

The Reynolds number for a fluid flow in a pipe or tube is a dimensionless number which provides the ratio of inertia forces to viscous forces. Generally, a flow with a large Reynolds number indicates turbulent flow, while a small Reynolds number is indicative of a flow in which the inertia forces are small compared to the viscous forces and are characteristically laminar flows. For the purposes of the present invention, the Reynolds number may be generally defined as:

$$Re = \frac{QD}{vA} = \frac{\rho \bar{V} D}{\mu}$$

where $\bar{V}$ is the mean fluid velocity of the fluid flow through the pipe (m/s);

D is the diameter of the pipe (m);

$\mu$ is the dynamic viscosity of the fluid (Pa·s or N·s/m$^2$);

v is the kinematic viscosity of the fluid (i.e.

$$v = \frac{\mu}{\rho})(m^2/s);$$

$\rho$ is the density of the fluid (kg/m$^3$);

Q is the volumetric flow rate of the fluid within the pipe (m$^3$/s); and

A is the cross-sectional area of the pipe (m$^2$).

It would be known to a person skilled in the art that a Reynolds number of less than 2300 is indicative of laminar flow, a Reynolds number of between 2300 and 4000 is indicative of transient flow and a Reynolds number of greater than 4000 is indicative of turbulent flow.

Therefore, better control over the Reynolds number of the flow is desired during the processing of the material in the processing system. According to a first aspect of the present invention, there is provided a method for size reduction of a material, the method comprising the steps of:

feeding material through a feed assembly into a cyclone chamber, the cyclone chamber having an elongate cylindrical conduit having a frusto-conical section;

adding at least one viscosity modifying agent into the cyclone chamber; and providing a cyclonic fluid stream within the cyclone chamber.

Viscosity is a fluid's internal resistance to flow. The higher the viscosity of a fluid, the more resistant the fluid is to flow. Conversely, the lower the viscosity of a fluid, the lower resistant the fluid is to flow. For the purposes of the present invention, a viscosity modifying agent is defined as an agent which when added into a system, is capable of changing the viscosity of the fluid flow within the system. In particular, the viscosity modifying agent may be capable of changing the kinematic viscosity of the fluid flow within the system. The kinematic viscosity of the fluid flow is the ratio of dynamic viscosity of the fluid flow and density of the fluid.

The viscosity modifying agent may be in the solid, liquid or gaseous state. The viscosity modifying agent may be a kinematic viscosity modifying agent. The term "viscosity modifying agent" encompasses flow promoters. Examples of viscosity modifying agents and flow promoters include, but are not limited to, moist air; water; warm air; cold air; oxygen; nitrogen; argon; carbon dioxide; water-based surfactants; calcium sulphate; glass; boric oxide; calcium fluoride; aluminium oxide; or a combination thereof. Other examples of viscosity modifying agents include, but are not limited to, helium, sulphur dioxide, castor oil, corn starch solution, glycerine and tar. The corn starch solution may be 22 Baume corn starch solution, 24 Baume corn starch solution or 26 Baume corn starch solution. For the purposes of the present invention, moist air is defined as air with a higher moisture content compared to ambient air. For the purposes of the present invention, warm air is defined as air having a temperature higher than the temperature of ambient air. For the purposes of the present invention, cold air is defined as air having a temperature lower than the temperature of ambient air.

The step of adding at least one viscosity modifying agent into the cyclone chamber may be carried out before or after the step of feeding material through a feed assembly into the cyclone chamber. The step of adding at least one viscosity modifying agent into the cyclone chamber may be carried out after the step of providing a cyclonic fluid stream within the cyclone chamber. The step of adding at least one viscosity modifying agent into the cyclone chamber may be repeated more than once. In particular, the step of adding at least one viscosity modifying agent may be repeated during the method for size reduction of the material fed through the feed assembly into the cyclone chamber.

According to a particular aspect, the cyclonic fluid stream within the cyclone chamber may have a kinematic viscosity ($\nu$) of $1\times10^{-8}$ m$^2$/s$\leq\nu\leq1\times10^{-1}$ m$^2$/s. The cyclonic fluid stream may comprise the material fed into the cyclone chamber through the feed assembly. Accordingly, reference to the cyclonic fluid stream having a particular kinematic viscosity may be a measure of the kinematic viscosity of the air stream comprising the material within the cyclone chamber. When the cyclonic fluid stream within the cyclone chamber has a kinematic viscosity ($\nu$) of $1\times10^{-8}$ m$^2$/s$\leq\nu\leq1\times10^{-1}$ m$^2$/s, flow conditions are optimised and the size of the material may be reduced efficiently. However, when the material whose size is to be reduced is added into the cyclone chamber, the fluid dynamics may change and consequently, the kinematic viscosity ($\nu$) of the cyclonic fluid stream may change.

Accordingly, the kinematic viscosity ($\nu$) of the cyclonic fluid stream may be modified by addition of at least one viscosity modifying agent. For example, when at least one viscosity modifying agent is added, the kinematic viscosity ($\nu$) of the cyclonic fluid stream within the cyclone chamber may change such that the kinematic viscosity ($\nu$) is $1\times10^{-8}$ m$^2$/s$\leq\nu\leq1\times10^{-1}$ m$^2$/s.

According to a particular aspect, the cyclonic fluid stream within the cyclone chamber may have a Reynolds number of $4\times10^3$-$1\times10^8$.

The addition of the at least one viscosity modifying agent may be a controlled addition of the at least one viscosity modifying agent. The addition of the at least one viscosity modifying agent may result in better control over the kinematic viscosity ($\nu$) of the cyclonic fluid stream within the cyclone chamber, thus improving the flow properties, stability and sustainability of the cyclonic fluid stream within the cyclone chamber. Any suitable amount of viscosity modifying agent may be added. In particular, the amount of viscosity modifying agent added may be dependent on the kinematic viscosity ($\nu$). Even more in particular, the amount of the at least one viscosity modifying agent added may be dependent on the amount required to bring the kinematic viscosity ($\nu$) of the cyclonic fluid stream to be $1\times10^{-8}$ m$^2$/s$\leq\nu\leq1\times10^{-1}$ m$^2$/s. The amount of the at least one viscosity modifying agent added may be dependent on the amount required to bring the Reynolds number of the cyclonic fluid stream to be $4\times10^3$-$1\times10^8$.

According to a particular aspect, the amount of viscosity modifying agent added may be dependent on the material whose size is to be reduced. For example, if the material is very large and/or very moist, the amount of viscosity modifying agent added into the cyclone chamber is increased. The addition of the viscosity modifying agent may enhance the processing of the material.

Any suitable viscosity modifying agent may be used for the purposes of the present invention. For example, the viscosity modifying agent may be selected from the group consisting of: moist air; water; warm air; cold air; oxygen; nitrogen; argon; carbon dioxide; water-based surfactants; calcium sulphate; glass; boric oxide; calcium fluoride; aluminium oxide; and a combination thereof. In particular, the viscosity modifying agent is water and/or moist air. Other examples of viscosity modifying agents include, but are not limited to, helium, sulphur dioxide, castor oil, corn starch solution, glycerine and tar. The corn starch solution may be 22 Baume corn starch solution, 24 Baume corn starch solution or 26 Baume corn starch solution.

According to a particular aspect, the material whose size is to be reduced may also be used after processing as a co-additive with at least one viscosity modifying agent. In particular, the material whose size has already been reduced may be added together with the at least one viscosity modifying agent. For example, if brown coal has been processed and reduced to a size of 5 nm-100 µm, then some of this material may be added when raw coal is being processed to alter the viscosity.

The cyclonic fluid stream within the cyclone chamber is provided by a device. Cyclonic fluid stream according to the present invention refers to a cyclone created in a stream of fluid passing through a conduit, preferably of circular cross-section. In a cyclonic fluid stream, the centripetal forces created by the motion of the fluid stream pull any particulate material entrained in the fluid stream away from the walls of the conduit and towards its central region. If a wide range of sonic frequencies are created within the conduit, a pattern of powerful vortices are created in the fluid stream. Energies are released by conversion of the potential energy to kinetic energy due to the stresses created within the cyclone which causes a minute explosion. The vortices of the cyclone take the form of implosions which are capable of breaking the material up further into smaller particles.

The vortices created in the cyclonic fluid stream carry further harmonic frequencies generated by the specially designed apparatus. This sets up a pulse from the standing wave configuration within the system, and this causes pockets of fluid within the standing wave to achieve a velocity beyond the sonic range. This can be tuned for a particular type of material which enhances the ability of the vortices created to break up very hard and soft materials such as stone and to reduce the moisture content of the materials.

The device used in the step of providing a cyclonic fluid stream within the cyclone chamber may be any suitable device which is capable of providing a cyclonic fluid stream. According to a particular aspect, the device may be located in an opening formed at the termination of the frusto-conical section of the cyclone chamber. An example of a device capable of providing a cyclonic fluid stream includes a fan. It would be obvious to a person skilled in the art that other devices which are capable of providing a cyclonic fluid stream are also within the scope of the present invention.

According to a particular aspect, the device may be an impellor fan. In particular, the impellor fan may comprise a plurality of radially extending vanes and a hub such that each of the plurality of vanes is equispaced about the hub. The impellor fan may further comprise an interrupter located within the hub for deflecting the fluid stream in front of the hub.

According to a particular aspect, the ratio of the volume of material fed into the feed assembly to the volume of air within the cyclone chamber may be ≤40%. If the volume of the material fed into the feed assembly exceeds 40% of the volume of air within the cyclone chamber, the vortex created within the cyclonic fluid stream may collapse and lose its processing capacity.

The method may further comprise the step of collecting material whose size has been reduced. The average particle size of the material whose size has been reduced may be 5 nm-150 µm. In particular, the average particle size of the material whose size has been reduced may be 8 nm-100 µm, 15 nm-50 µm, 25 nm-25 µm, 30 nm-20 µm, 50 nm-10 µm, 75 nm-5 µm, 100 nm-800 nm, 150 nm-700 nm, 200 nm-600 nm, 300 nm-500 nm, 400 nm-450 nm. Even more in particular, the average particle size of the material whose size has been reduced is 20-100 µm. A skilled person would understand that the average particle size is dependent on the application in which the material whose size has been reduced is going to be used and the end use of the material whose size has been reduced. For example, for coal, the average particle size of coal after the method for size reduction of the present invention may be 50-100 µm. For zinc oxide for use in the preparation of cosmetics, the average particle size of zinc oxide after the method for size reduction of the present invention may be 20-40 nm.

For the purposes of the present invention, average particle size of a material refers to the average particle size of a material on a mass basis. The particle size of a material may be defined by its largest dimension. Any standard method suitable for determining the particle size may be used. For example, the Mastersizer 2000 particle size analyzer (Malvern Instruments Limited) may be used for determining the particle size. The particle size distribution may be determined by any suitable method. For example, the method as described in ASTM C136 or ASTM C117 may be used to determine the particle size distribution of fine and coarse aggregates by sieving. For example, a bulk sample comprising material whose size has been reduced is sieved through a set of sieves, each sieve ranging in size. The sieves may be standard sieves. The bulk sample is sieved through the stack of sieves to determine the particle size distribution by measuring the weight of the material remaining on each sieve.

A second aspect of the present invention is an apparatus for size reduction of a material according to the method described above. The apparatus comprises:
 a cyclone chamber having an elongate cylindrical conduit having a frusto-conical section;
 a device for creating a cyclonic fluid stream within the cyclone chamber, such that the frusto-conical section of the cyclone chamber terminates in an opening forming the inlet to the device;
 an air inlet tube in fluid connection with the cyclone chamber at the opposite end of the frusto-conical section; and
 a feed assembly for feeding material into the cyclone chamber.

The device for creating a cyclonic fluid stream within the cyclone chamber may be any suitable device. An example of a device for creating a cyclonic fluid stream includes a fan.

According to a particular aspect, the device may be an impellor fan. In particular, the impellor fan may comprise a plurality of radially extending vanes and a hub such that each of the plurality of vanes is equispaced about the hub. The impellor fan may further comprise an interrupter located within the hub for deflecting the cyclonic fluid stream in front of the hub.

The apparatus may further comprise a computer control system for controlling the amount of feeding material fed through the feed assembly into the cyclone chamber. The computer control system may also control the amount of fluid within the cyclone chamber. The computer control system may also control the amount of the at least one viscosity modifying agent added into the cyclone chamber. In particular, the computer control system is capable of monitoring the head loss and cyclonic air (fluid) velocity which are a direct measure of the kinematic viscosity of the material being fed into the cyclone chamber through the feed assembly for any particular system geometry.

As mentioned above, the addition of the at least one viscosity modifying agent may be a controlled addition of the at least one viscosity modifying agent. The addition of the at least one viscosity modifying agent may be controlled by a computer control system. For example, the computer control system may detect a change in the kinematic viscosity (v) of the cyclonic fluid stream within the cyclone chamber such that the kinematic viscosity (v) is outside a pre-determined range. The computer control system may detect a change in the Reynolds number of the cyclonic fluid stream within the cyclone chamber such that the Reynolds number is outside a pre-determined range. The computer control system will therefore prompt the controlled addition of at least one viscosity modifying agent in order to return the kinematic viscosity (v) to within its pre-determined range. Therefore, the computer control system may aid in improving the flow properties, stability and sustainability of the cyclonic fluid stream within the cyclone chamber.

The different parts of the apparatus are described in more detail below.

According to third aspect, the present invention provides a method for size reduction of a material, the method comprising the steps of:

feeding material through a feed assembly into a cyclone chamber, the cyclone chamber having an elongate cylindrical conduit having a frusto-conical section; and
providing a cyclonic fluid stream within the cyclone chamber,
wherein the cyclonic fluid stream has a kinematic viscosity (v) of $1\times10^{-8}$ m$^2$/s$\leq$v$\leq$1$\times10^{-1}$ m$^2$/s.

According to a particular aspect, the Reynolds number of the cyclonic fluid stream may be $4\times10^3$-$1\times10^8$.

The method may further comprise the step of adding at least one viscosity modifying agent into the cyclone chamber. Any suitable viscosity modifying agent may be used for the purposes of the present invention, as described above. The step of adding the at least one viscosity modifying agent may be carried out before or after the step of feeding material through a feed assembly into the cyclone chamber. The step of adding at least one viscosity modifying agent into the cyclone chamber may be carried out after the step of providing a cyclonic fluid stream within the cyclone chamber. The step of adding at least one viscosity modifying agent into the cyclone chamber may be repeated more than once. In particular, the step of adding at least one viscosity modifying agent may be repeated during the method for size reduction of the material fed through the feed assembly into the cyclone chamber.

According to a particular aspect, when the cyclonic fluid stream within the cyclone chamber has a kinematic viscosity (v) of $1\times10^{-8}$ m$^2$/s$\leq$v$\leq$1$\times10^{-1}$ m$^2$/s, flow conditions are optimised and the size of the material may be reduced efficiently. However, when the material whose size is to be reduced is added into the cyclone chamber, the fluid dynamics may change and consequently, the kinematic viscosity (v) of the cyclonic fluid stream may change.

Accordingly, the kinematic viscosity (v) of the cyclonic fluid stream may be modified by addition of at least one viscosity modifying agent. For example, when at least one viscosity modifying agent is added, the kinematic viscosity (v) of the cyclonic fluid stream within the cyclone chamber may change such that the kinematic viscosity (v) is $1\times10^{-8}$ m$^2$/s$\leq$v$\leq$1$\times10^{-1}$ m$^2$/s.

The addition of the at least one viscosity modifying agent may be a controlled addition of the at least one viscosity modifying agent. The addition of the at least one viscosity modifying agent may result in better control of the kinematic viscosity (v) of the cyclonic fluid stream within the cyclone chamber, thus improving the flow properties, stability and sustainability of the cyclonic fluid stream within the cyclone chamber. Any suitable amount of viscosity modifying agent may be added. In particular, the amount of viscosity modifying agent added may be dependent on the kinematic viscosity (v). Even more in particular, the amount of the at least one viscosity modifying agent added may be dependent on the amount required to bring the kinematic viscosity (v) of the cyclonic fluid stream to be $1\times10^{-8}$ m$^2$/s$\leq$v$\leq$1$\times10^{-1}$ m$^2$/s. According to a particular aspect, the amount of viscosity modifying agent added may be dependent on the material whose size is to be reduced. For example, if the material is very large and/or very moist, the amount of viscosity modifying agent added into the cyclone chamber is increased. The addition of the viscosity modifying agent may enhance the processing of the material.

According to a particular aspect, the amount of the at least one viscosity modifying agent added may be dependent on the amount required to bring the Reynolds number of the cyclonic fluid stream to be $4\times10^3$-$1\times10^8$.

According to a particular aspect, the material whose size is to be reduced may also be used after processing as a co-additive with at least one viscosity modifying agent. In particular, material whose size has already been reduced may be added together with the at least one viscosity modifying agent. For example, if brown coal has been processed and reduced to a size of 5 nm-100 μm, then some of this material may be added when raw coal is being processed to alter the viscosity.

The device used in the step of providing a cyclonic fluid stream within the cyclone chamber may be any suitable device which is capable of providing a cyclonic fluid stream. According to a particular aspect, the device may be located in an opening formed at the termination of the frusto-conical section of the cyclone chamber. Examples of devices capable of providing a cyclonic fluid stream are provided above.

According to a particular aspect, the device may be an impellor fan. In particular, the impellor fan may comprise a plurality of radially extending vanes and a hub such that each of the plurality of vanes is equispaced about the hub. The impellor fan may further comprise an interrupter located within the hub for deflecting the cyclonic fluid stream in front of the hub.

According to a particular aspect, the ratio of the volume of material fed into the feed assembly to the volume of air within the cyclone chamber may be $\leq$40%. If the volume of the material fed into the feed assembly exceeds 40% of the volume of air within the cyclone chamber, the vortex created within the cyclonic air stream may collapse and lose its processing capacity.

The method may further comprise the step of collecting material whose size has been reduced. The average particle size of the material whose size has been reduced may be 5 nm-150 μm. In particular, the average particle size of the material whose size has been reduced may be 8 nm-100 μm, 15 nm-50 µm, 25 nm-25 µm, 30 nm-20 µm, 50 nm-10 µm, 75 nm-5 µm, 100 nm-800 nm, 150 nm-700 nm, 200 nm-600 nm, 300 nm-500 nm, 400 nm-450 nm. Even more in particular, the average particle size of the material after the material has undergone size reduction is 20-100 µm. A skilled person would understand that the average particle size is dependent on the application in which the material whose size has been reduced is going to be used and the end use of the material whose size has been reduced. For example, for coal, the average particle size of coal after the method for size reduction of the present invention may be 50-100 µm. For zinc oxide for use in the preparation of cosmetics, the average particle size of zinc oxide after the method for size reduction of the present invention may be 20-40 nm.

The present invention also provides an apparatus for size reduction of a material according to the method of the third aspect of the present invention described above. The apparatus comprises:
- a cyclone chamber having an elongate cylindrical conduit having a frusto-conical section;
- a device for creating a cyclonic fluid stream within the cyclone chamber, such that the frusto-conical section of the cyclone chamber terminates in an opening forming the inlet to the device;
- an air inlet tube in fluid connection with the cyclone chamber at the opposite end of the frusto-conical section;
- a feed assembly for feeding material into the cyclone chamber; and
- a computer control system for monitoring the kinematic viscosity (v) of the cyclonic fluid stream in the cyclone chamber.

The device for creating a cyclonic fluid stream within the cyclone chamber may be any suitable device. An example of a device for creating a cyclonic fluid stream includes a fan.

According to a particular aspect, the device may be an impellor fan. In particular, the impellor fan may comprise a plurality of radially extending vanes and a hub such that each of the plurality of vanes is equispaced about the hub. The impellor fan may further comprise an interrupter located within the hub for deflecting the fluid stream in front of the hub.

According to a particular aspect, the computer control system for monitoring the kinematic viscosity (v) of the cyclonic fluid stream in the cyclone chamber is such that the computer control system may detect if the kinematic viscosity (v) of the cyclonic fluid stream is outside a pre-determined range. The pre-determined range may be $1 \times 10^{-8} \text{ m}^2/\text{s} \leq v \leq 1 \times 10^{-1} \text{ m}^2/\text{s}$. The computer control system may detect if the Reynolds number of the cyclonic fluid stream is outside a pre-determined range.

The computer control system may be capable of monitoring the head loss and cyclonic air (fluid) velocity which are a direct measure of the kinematic viscosity of the material being fed into the cyclone chamber through the feed assembly for any particular system geometry. In particular, when the kinematic viscosity (v) of the cyclonic fluid stream is outside the pre-determined range, the computer control system may prompt the alteration of flow conditions within the cyclone chamber. In particular, the computer control system may cause the addition of at least one viscosity modifying agent in order to return the kinematic viscosity (v) and/or Reynolds number of the cyclonic fluid stream to be within a pre-determined range. Therefore, the computer control system may aid in improving the flow properties, stability and sustainability of the cyclonic fluid stream within the cyclone chamber. The addition of at least one viscosity modifying agent may be as described above.

The different parts of the apparatus are described in more detail below.

A further aspect of the present invention is an apparatus for size reduction of a material comprising:
- a cyclone chamber having an elongate cylindrical conduit having a frusto-conical section;
- a device for creating a cyclonic fluid stream within the cyclone chamber, such that the frusto-conical section of the cyclone chamber terminates in an opening forming the inlet to the device;
- an air inlet tube in fluid connection with the cyclone chamber at the opposite end of the frusto-conical section; and
- a feed assembly for feeding material into the cyclone chamber, wherein the ratio of diameter of the feed assembly to diameter of the air inlet tube is 0.3-0.5.

In particular, the ratio of the diameter of the feed assembly to the diameter of the air inlet tube is 0.5. Such a ratio may provide for a maximum volume of air to volume of material ratio of 60:40. When the material whose size to be reduced is a slurry, the ratio of the diameter of the feed assembly to the diameter of the air inlet tube is 0.35.

The apparatus may further comprise a computer control system for controlling the amount of material fed through the feed assembly into the cyclone chamber and the amount of fluid within the cyclone chamber.

The different parts of the apparatus are described in more detail below.

There is also provided a method for size reduction of a material in the apparatus as described above, the method comprising the step of controlling ratio of the volume of material fed into the feed assembly to the volume of air within the cyclone chamber is ≤40%. In particular, the ratio of the volume of material fed into the feed assembly to the volume of air within the cyclone chamber is ≤35%, ≤30%, ≤25%, ≤20%.

According to a particular aspect, the step of controlling the ratio of the volume of material fed into the feed assembly to the volume of air within the cyclone chamber may be carried out by a computer control system. Any suitable computer control system may be used. For example, the computer control system may control the ratio by controlling the amount of material fed through the feed assembly into the cyclone chamber and the amount of air within the cyclone chamber.

The method may further comprise the step of collecting material whose size has been reduced. The average particle size of the material whose size has been reduced may be 5 nm-150 µm. In particular, the average particle size of the material whose size has been reduced may be 8 nm-100 µm, 15 nm-50 µm, 25 nm-25 µm, 30 nm-20 µm, 50 nm-10 µm, 75 nm-5 µm, 100 nm-800 nm, 150 nm-700 nm, 200 nm-600 nm, 300 nm-500 nm, 400 nm-450 nm. Even more in particular, the average particle size of the material after the material has undergone size reduction is 20-100 µm. A skilled person would understand that the average particle size is dependent on the application in which the material whose size has been reduced is going to be used and the end use of the material whose size has been reduced. For example, for coal, the average particle size of coal after the method for size reduction of the present invention may be 50-100 µm. For zinc oxide for use in the preparation of cosmetics, the average particle size of zinc oxide after the method for size reduction of the present invention may be 20-40 nm.

Another aspect of the present invention is a method for size reduction of a material, the method comprising the steps of:

feeding material through a feed assembly into a cyclone chamber, the cyclone chamber having an elongate cylindrical conduit having a frusto-conical section;

providing a cyclonic fluid stream within the cyclone chamber; and controlling the ratio of the volume of material fed into the feed assembly to the volume of air within the cyclone chamber, wherein the ratio is ≤40%.

In particular, the ratio of the volume of material fed into the feed assembly to the volume of air within the cyclone chamber is ≤35%, ≤30%, ≤25%, ≤20%.

The device used in the step of providing a cyclonic fluid stream within the cyclone chamber may be any suitable device which is capable of providing a cyclonic fluid stream. According to a particular aspect, the device may be located in an opening formed at the termination of the frusto-conical section of the cyclone chamber. Examples of devices capable of providing a cyclonic fluid stream are provided above.

According to a particular aspect, the device may be an impellor fan. In particular, the impellor fan may comprise a plurality of radially extending vanes and a hub such that each of the plurality of vanes is equispaced about the hub. The impellor fan may further comprise an interrupter located within the hub for deflecting the cyclonic fluid stream in front of the hub.

The method may further comprise the step of collecting material whose size has been reduced. The average particle size of the material whose size has been reduced may be 5 nm-150 μm. In particular, the average particle size of the material whose size has been reduced may be 8 nm-100 μm, 15 nm-50 μm, 25 nm-25 μm, 30 nm-20 μm, 50 nm-10 μm, 75 nm-5 μm, 100 nm-800 nm, 150 nm-700 nm, 200 nm-600 nm, 300 nm-500 nm, 400 nm-450 nm. Even more in particular, the average particle size of the material after the material has undergone size reduction is 20-100 μm. A skilled person would understand that the average particle size is dependent on the application in which the material whose size has been reduced is going to be used and the end use of the material whose size has been reduced. For example, for coal, the average particle size of coal after the method for size reduction of the present invention may be 50-100 μm. For zinc oxide for use in the preparation of cosmetics, the average particle size of zinc oxide after the method for size reduction of the present invention may be 20-40 nm.

When the fluid dynamic conditions of the cyclonic fluid stream within the cyclone chamber are optimised in view of the methods according to any aspect of the present invention, a reverse vortex may be created inside the outer vortex within the cyclonic fluid stream such that a sustainable cyclonic fluid stream is produced. The intersection of the outer and inner vortices creates a turbulent boundary layer. The intense disruption caused by the interaction between particles of material within the cyclone chamber in the boundary layer breaks the material into particles of varying sizes. The main vortex spirals in one direction and carries most of the coarser particles and the inner vortex spirals in the opposite direction and carries finer particles.

Further, any water which may be contained in the particles of the material may evaporate rapidly as the particles move to a lower pressure zone. This evaporation may be sufficiently rapid to further break down the particles. As the particles break down, more of the surface of the particle is exposed and this facilitates further evaporation.

The suspended particles of the material do not move in a smooth spiral around the cyclonic fluid stream. In particular, the large and small particles collide with each other and develop opposite electrical charges due to triboelectric processes. The larger particles become positively charged and the smaller particles become negatively charged.

At some point, particularly in areas of low pressure within the cyclone chamber, the oppositely charged particles will come into sufficiently close proximity for the electrostatic field to be of sufficient influence to ionise the air between them. Depending on the pressure, this may result in either corona or glow discharge plasmas being formed.

At atmospheric pressure, the breakdown voltage in dry air is 30 KV/cm. This is significantly reduced at lower pressures and at higher humidity levels. In addition, because electric field strength is inversely proportional to the radius of particle, the breakdown voltage is lower for smaller particles. Therefore, as the particles continue to reduce in size, the ionisation process becomes more likely and more frequent.

Electrostatic discharges are therefore produced and transmit high frequency radio waves which could be used for monitoring the method of size reduction and for the purposes of feedback control.

An embodiment of the apparatus according to the present invention is shown in FIG. 1. The apparatus 100 comprises an impeller suction fan 5 and a cyclone chamber 4. The cyclone chamber 4 is generally cylindrical and is arranged such that its longitudinal axis lies along the axis of rotation of the impeller suction fan 5. The impeller suction fan 5 is rotatably supported within a housing 6. The impeller suction fan 5 creates the rotation and suction of air.

The impeller suction fan 5 is keyed to one end of a drive shaft (not shown) which is supported by a tunnel bearing 9 mounted on the rear of the housing 6. A drive train 10 is fastened to the other end of the shaft. The drive train 10 provides power to apparatus 100. In operation, the drive train 10 is driven by a variable speed motor, internal combustion engine or any mechanical driver 12. The impeller suction fan is driven at typical speeds of 90-250 m/s. However, a skilled person would realise that any suitable speed may be used for the purposes of the present invention. In particular, the speed of the impeller suction fan may depend on the kinematic viscosity of the material being processed. The speed of the impeller suction fan may change in response to the degree of comminution of the material. The drive train 10 is secured to a bench 11. Bench 11 may be cushioned.

One end of the cyclone chamber 4 is fitted with an air inlet tube 3 in engagement therewith. The other end of the cyclone chamber 4 terminates in a frusto-conical section 4a which has an opening (not shown).

The cyclone chamber 4 is secured, for example by welding, so that the opening of the housing 6 and the mouth of the frusto-conical section 4a are coincident. Thus the inlet of the impeller suction fan 5 extends partly into the frusto-conical section 4a of the cyclone chamber 4. In particular, the internal width of the housing 6 would be approximately 5 cm wider than the width of the impeller suction fan 5.

A feed assembly 2 for receiving the material whose size is to be reduced is mounted on the air inlet tube 3 adjacent an open end 3a thereof and partly extending into the air inlet tube 3. Any suitable feed assembly can be used for the purposes of the present invention. The material to be reduced is fed through the feed assembly 2 subsequently enters the air inlet tube 3. Air and material pass through the air inlet tube 3 before entering the cyclone chamber 4. The air inlet tube 3 is also connected to a stator 1 at the open end 3a of the air inlet tube 3. The stator 1 is an egg-shaped focal point which focuses the tail of the vortex created in the cyclonic fluid stream within the cyclone chamber 4.

The feed assembly 2 regulates the ratio of the volume of material fed through the feed assembly 2 to the volume of fluid within the cyclone chamber 4 during the operation of the apparatus 100. This may be controlled by the diameter of the feed assembly 2 in relation to the diameter of the air inlet tube 3.

Apparatus 100 also comprises an exhaust duct 8. Air and material go through the exhaust duct 8 after the air and material have passed through the cyclone chamber 4. The air and material which go through the exhaust duct 8 may be directed to a collection and disbursement area.

The impeller suction fan 5 comprises a plurality of radially extending vanes 5a. Preferably, the number of vanes 5a is from eight to twelve, depending on the type of material to be granulated. Greater average particle size reduction of the material exiting exhaust duct 8 may be achieved with a higher number of vanes 5a, while drier material exits the exhaust duct with lesser number of vanes 5a. The vanes 5a may be formed of and further may be coated with a layer of high abrasion resistant material to protect the vanes 5a against metal contamination as well as to provide a cushion to protect brittle particles such as diamonds which are released from ore such as kimberlite to allow large diamonds which would otherwise be crushed to emerge intact.

Each of the vanes 5a is offset from the radius of the impeller by an angle within 3-10°. The higher the angle, the better suited is apparatus 100 for applications requiring greater moisture reduction of the material fed through the feed assembly 2. A lower angle is better suited for applications requiring greater size reduction of the material fed through the feed assembly 2. The vanes 5a are equispaced about a hub (not shown). The hub receives the vanes 5a and is secured to the drive shaft. Each vane 5a is generally concave, the concavity of each vane 5a facing the direction of rotation of the impeller suction fan 5.

An interrupter 13 may be fitted into a central bore at the front side of the hub facing the inlet of the impeller suction fan 5. The interrupter 13 is a discordant shaped object lock nut which locks the impeller suction fan 5 onto the drive shaft. The interrupter 13 may comprise a disc mounted on a central spine. The spine may be screw-threaded so that the interrupter 13 can be screw-fitted into the central bore of the hub. The interrupter 13 disturbs the stationary fluid directly in front of the hub. The interrupter 13 has a diameter approximately equal to the diameter of the hub. In particular, the centre diameter of the interrupter 13 may be approximately equal to the diameter of the hub.

The orientation and design of the impeller vanes 5a can be further optimised by computer-aided design and can be further adjusted dynamically to compensate for any wear of the vanes. In particular, the degree of curvature of the vanes can be adjusted by computational fluid dynamics analysing wear patterns created by a given product and redesigning the vane to give optimum freedom from abrasion.

The apparatus 100 also comprises a scroll 7 which is a multiple-angled spiral-shaped volute inside the housing which determines the air volume contained and exhausted by apparatus 100 in combination with the air inlet tube 3. According to a particular embodiment, the housing 6 contains a scroll 7 with a total volume in proportion to the diameter of the impeller suction fan 5, such that for every 300 mm in the diameter of the impeller suction fan 5, the volume of the scroll 7 should be 0.120-0.177 m$^3$. In particular, the volume of the scroll 7 may be 0.150 m$^3$ for every 300 mm diameter of the impeller suction fan 5.

The scroll 7 may extend from the inside wall of the exhaust duct 8 to the outside wall of the exhaust duct 8 in a spiral shape to create the total air volume capacity of the apparatus 100.

According to a particular embodiment, the discharge area of the exhaust duct 8 may be approximately 35% of the volume of the scroll 7. The exhaust duct 8 is attached to the housing 6 where the scroll 7 terminates.

The granulation and drying of a material may be further improved by introducing an externally generated frequency to the cyclonic fluid stream by means of a speaker or electrical feed, for example. Typical frequencies may be 25 to 28 Hz, 57.6 Hz, 576 Hz for a fan running at 5760 rpm. Disassociation of water can be enhanced by introduction of a frequency of approximately 42.7 Hz.

Apparatus 100 may also comprise a computer control system (not shown). The computer control system may maintain and/or monitor the operation of the apparatus 100. In particular, the computer control system may maintain and/or monitor the operational constancy when material whose size is to be reduced is fed into the apparatus 100. Even more in particular, the computer control system may monitor the kinematic viscosity (v) and/or the Reynolds number of the cyclonic fluid stream within the cyclone chamber 4 and/or the ratio of the volume of the material fed into the feed assembly to the volume of the fluid within the cyclone chamber 4.

According to a particular embodiment, the length of the air inlet tube 3 is within 200-240% of the diameter of the impeller suction fan 5. Even more in particular, the length of the air inlet tube 3 is approximately 220% of the diameter of the impeller suction fan 5.

According to another particular embodiment, the width of the air inlet tube 3 is approximately 33% of the diameter of the impeller suction fan 5.

Another particular embodiment provides that the size of the stator 1 may be varied to produce differing processing results of the same input material fed through the feed assembly 2. For example, when a smaller stator 1 is used, the final average particle size of the material passing through the exhaust duct 8 will be larger compared to when a larger stator 1 is used. In particular, the diameter of the stator should not exceed 50% of the diameter of the air inlet tube.

According to a particular embodiment, the length of the cyclone chamber 4 is within 65-85%, 70-80%, 75-78% of the length of the air inlet tube 3. Even more in particular, the length of the cyclone chamber 4 is 70% of the length of the air inlet tube 3.

According to another particular embodiment, the width of the cyclone chamber 4 reduces over its length from the width of the impeller suction fan 5 to the width of the air inlet tube 3.

According to a particular embodiment, the diameter of the impeller suction fan 5 may be three times the width of the air inlet tube 3a. The vanes 5a of the impeller suction fan 5 may be positioned from the hub of the impeller suction fan 5 to a fixing ring at an angle of 45° to the axis of rotation of the impeller suction fan 5. Further, the width of the impeller suction fan 5 may be one third the diameter of the impeller suction fan 5.

The apparatus 100 may be scaled to any size provided the ratio of all components is kept to scale and sufficient power is provided during operation of the apparatus 100.

In operation, the motor 12 is run-up to speed until the optimum conditions are achieved for granulating a particular material by tuning the apparatus to the natural resonance frequency of the material. The drive train 10 and its control are of significant importance. It must provide sufficient power for a cyclonic fluid stream to be formed within the cyclone chamber 4. Motor 12 may also have to increase its power once the material whose size is to be reduced is fed through the feed assembly 2 into the cyclone chamber 4 so that the vortices formed within the cyclonic fluid stream in the cyclone chamber 4 do not collapse.

The types of materials which may granulated by the apparatus according to any aspect of the present invention ranges from metal ores, glass, plastic, coal, lignite (brown coal), petroleum coke, mezotrace, oil shale, drywall, ash, manure, sewage sludge, salt crystal, mineral and ore bearing sand, fertilizers, cement raw materials, black sand, grains such as soybeans, corn, oats, barley, milo and rice.

The apparatus according to any aspect of the present invention can be utilised to reduce the moisture content of numerous materials such as wet clay, paper pulp, brown coal, phosphates, sulphates, fish and bones to produce a fine dry powder. It is also useful for drying pigmentation cake which contains up to 50% water. Mining slurries can be dried either in powder form or dewatered sufficiently for chemical treatment for extraction of metals.

The material to be reduced in size is fed into the feed assembly 2 and enters the air inlet tube 3. The material then passes through the air inlet tube 3 and enters the path of the cyclonic fluid stream created by the impeller suction fan 5 within the cyclone chamber 4. The material is fragmented within the cyclone chamber 4 before entering the impeller suction fan 5 due to the tuned harmonics carried by the vortices within the cyclonic fluid stream and is drawn by the cyclonic fluid stream into the inlet of the impeller suction fan 5.

The material then enters the exhaust duct 8 and exits the apparatus 100 to a collection and disbursement area. The size of the exhaust duct 8 can be varied to adjust the fluid flow through the apparatus 100.

Materials which have exited the apparatus 100 through the exhaust duct 8 are sorted according to the average particle size by any suitable method known in the art. Materials having a larger average particle size than desired may be fed back into the apparatus 100 through the feed assembly 2 into cyclone chamber 4 for re-processing.

As described above, a computer control system may be installed. During normal operation, there is virtually no load, particularly if a DC constant torque motor is utilised to drive the impeller suction fan 5. Therefore, sensors can be provided to detect any increase in load, for example due to a large particle hitting the impeller suction fan 5, to activate a cut-off switch and brake.

The sensors may alternatively, detect particularly large particles in transit such as diamonds and perform the same function. Sensors may also be utilised to detect large particles in the exhaust duct 8 and increase the speed of the impeller suction fan 5 to ensure that the material is finely granulated.

The computer control system may also detect changes in kinematic viscosity (v) of the cyclonic fluid stream within the cyclone chamber 4. According to a particular embodiment, if the kinematic viscosity (v) of the cyclonic fluid stream within the cyclone chamber 4 falls outside a pre-determined range, the computer control system may prompt the alteration of flow conditions within the cyclone chamber 4. In particular, the computer control system may cause the addition of at least one viscosity modifying agent into the cyclone chamber 4 in order to return the kinematic viscosity (v) of the cyclonic fluid stream in the cyclone chamber 4 within the pre-determined range. Any suitable viscosity modifying agent may be used for the purposes of the present invention as described above.

The computer control system may also detect changes in the ratio of the volume of material fed through the feed assembly 2 to the volume of the fluid within the cyclone chamber 4. If the ratio exceeds a pre-determined value, the computer control system adjusts the amount of fluid present in the cyclone chamber 4 by altering the speed of the impeller suction fan 5 and/or the amount of material being fed through the feed assembly 2 into the cyclone chamber 4. In particular, if the volume of material fed through the feed assembly 2 into the cyclone chamber exceeds 40% of the volume of air within the cyclone chamber 4, the vortices within the cyclonic fluid stream in the cyclone chamber 4 may collapse. According to a particular embodiment, the ratio of the volume of material fed through the feed assembly 2 into the cyclone chamber 4 to the volume of air in the cyclone chamber 4 is ≤40%.

In the light of this disclosure, modifications of the described embodiment, as well as other embodiments, all within the scope of the appended claims will now become apparent to persons skilled in the art. Arrangement of the different parts of the apparatus according to any aspect of the present invention are similar to the apparatus described in prior art such as in WO 98/35756, U.S. Pat. No. 7,500,830, WO 03/006166, herein incorporated by reference, and the like.

Having now generally described the invention, the same will be more readily understood through reference to the following examples which are provided by way of illustration, and are not intended to be limiting of the present invention.

EXAMPLES

Example 1

The following example exemplifies the determination of a suitable range of kinematic viscosity (v) within which to carry out the method according to any aspect of the present invention.

The Moody Diagram can be represented by the Colebrook White equation:

$$f^{-1/2} = -4\log\left[\left(\frac{k_s}{3.71d}\right) + \left(\frac{1.26f^{-1/2}}{Re}\right)\right] \quad \text{Equation (1)}$$

where:

f is the friction factor (often referred to as λ in the Moody Diagram where λ=4f);

$$\frac{k_s}{d}$$

represents the relative pipe roughness; and

Re represents the Reynolds number.

Equation 1 can be solved iteratively for f for known values of Re and $$\frac{k_s}{d}.$$

$$Re = \frac{ud}{v} \quad \text{Equation (2)}$$

where:
u is the airflow (fluid) velocity through the pipe;
d is the diameter of the pipe
ν is the kinematic viscosity of the material being processed.

$$v = \frac{\mu}{\rho} \quad \text{Equation (3)}$$

where:
μ is the dynamic viscosity
ρ is the density.

The pressure drop in the pipe is represented by Equation (4) as follows:

$$\Delta P = h_f \rho g \quad \text{Equation (4)}$$

where:
$h_f$ is the head loss in the pipe and
g is the acceleration due to gravity.

The Darcy-Weisbach equation for turbulent flow in a pipe with circular cross-section represents $h_f$ as follows:

$$h_f = \frac{2fLu^2}{dg} \quad \text{Equation (5)}$$

where,
L is the length of the pipe.

Typical experimental values for some parameters have been used in this analysis. In particular, d=0.305 m, L=1.610 m, and u=166 m/s.

In fluid dynamic analysis of fluid flow through pipes, $$\frac{k_s}{d}$$

is taken as a measure of the roughness of the inside of the pipe. For the purposes of the present analysis, however, it is taken to be a measure of any parameter which alters the level of turbulence during processing such as particle size, shape etc.

A Moody diagram shows two distinct regions of turbulence which can be used for materials processing—transitional turbulence and complete turbulence regions. It can be shown that these two regions have completely different processing characteristics.

Control is exercised over the process of the present invention by changing the airflow (fluid) velocity (i.e. by changing the speed of the impellor) to maintain the optimum pressure drop and therefore, head loss for the properties of the material being processed. These material properties are characterised by the kinematic viscosity, ν, of the material which determines its flow characteristics.

Figure 2:
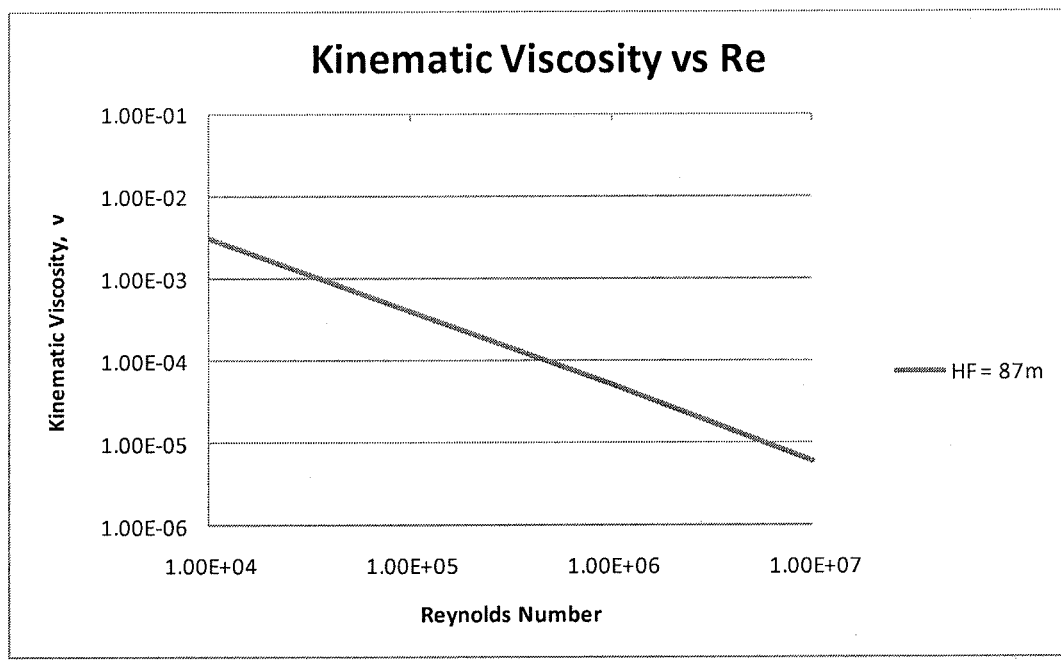
FIG. 2 shows a plot of kinematic viscosity against Reynolds number for a head loss of 87 m.

It can be seen from FIG. 2 that within the transitional turbulence region, i.e.

$$\frac{k_s}{d} = 1 \times 10^{-6}$$

which represents a pipe with smooth sides, a material with high ν is processed at low Reynolds Numbers and material with low ν is processed at high Reynolds Numbers. FIG. 2 was obtained by mathematically manipulating equations 1 to 5. FIG. 2 shows how the system handles material of different (or changing) kinematic viscosity in the transitional turbulence region. Controlling the head loss to a particular value, for example, 87 m, by changing the airflow (fluid) velocity allows material with a kinematic viscosity range over three orders of magnitude to be processed. Materials of different kinematic viscosities are processed at different values of Reynolds number, depending on the velocity required to maintain the head loss.

In particular, the materials in this example are processed at a head loss of approximately 87 m and the airflow (fluid) velocity, u, is varied between 100 and 200 m/s to maintain this $h_f$ value over the kinematic viscosity range of the materials (three orders of magnitude).

For any given material it is possible to change its kinematic viscosity to allow better processing under system operating conditions which may be restricted in terms of fluid flow velocity or pressure drop. Changes in ν can be brought about in many ways, such as by adding a viscosity modifying agent as this will alter the dynamic viscosity, μ, of the material. The density, ρ, depends on the density of the material being processed, the density of the gas/liquid and also on the size and shape of the material being processed. In particular, the density of the material being processed can be changed by changing the size of the particles/granules and their tendency to agglomerate through the addition of surfactants. Changes in the dynamic viscosity, μ, and the density, ρ, of the materials being processed will change its kinematic viscosity, ν, and its flow characteristics in the regions of turbulence.

Figure 3:
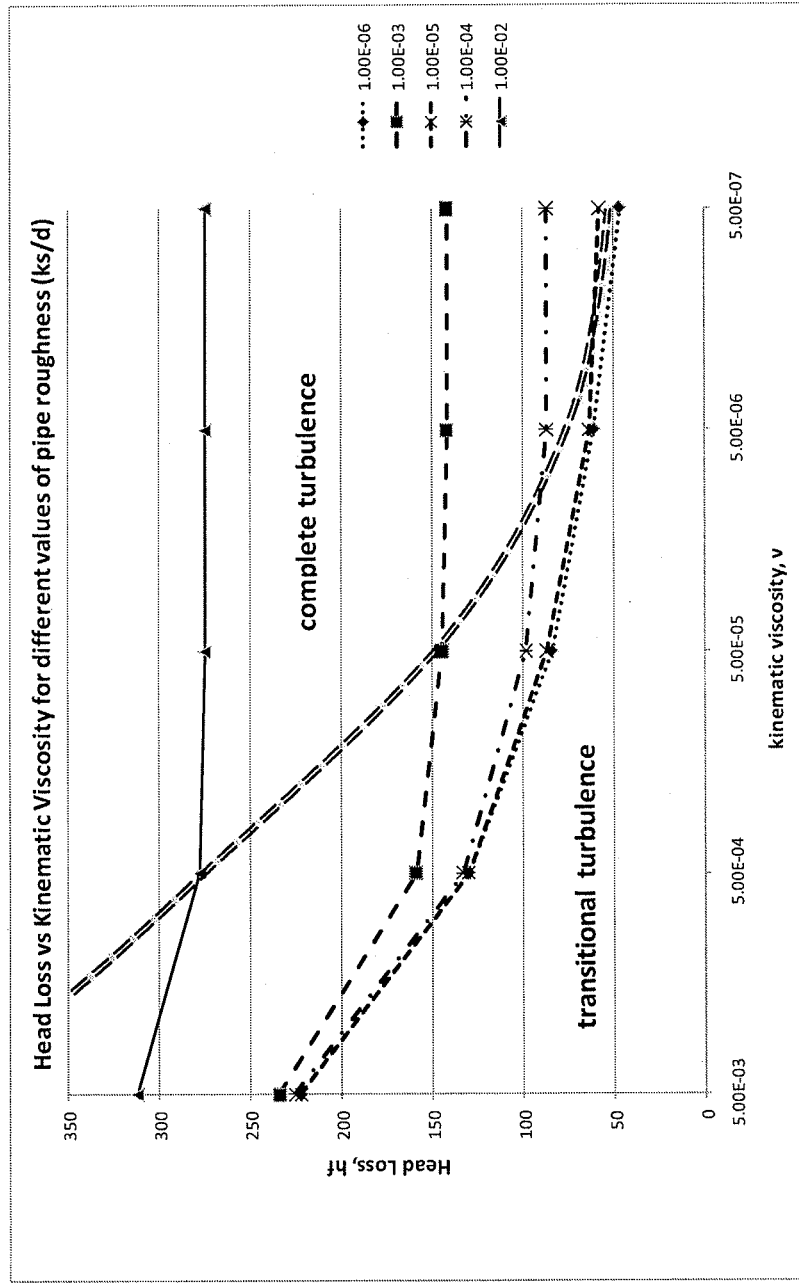
FIG. 3 shows a plot of head loss against kinematic viscosity for different values of pipe roughness $$\left(\frac{k_s}{d}\right).$$

FIG. 3 represents a processing system operating at an fluid-flow velocity of approximately 163 m/s. FIG. 3 shows a plot of head loss against kinematic viscosity for different values of pipe roughness. The pipe roughness takes into account the solids content in the fluid stream and the frictional and turbulence effects caused by their motions. FIG. 3 was obtained by mathematically manipulating equations 1 to 5. The line determining the boundary between transitional turbulence and complete turbulence is the locus of the points at which the head loss no longer varies with kinematic viscosity.

It can be seen that changing the kinematic viscosity of the material being processed as described above only has an effect in the transitional turbulence region. In the complete turbulence region, changes in kinematic viscosity provide no control over the level of system head loss. For optimum processability, regardless of the degree of comminution (i.e. the friction factor), the kinematic viscosity has to be within a certain range to ensure that processing takes place within the transitional turbulence regime, as seen in FIG. 3. In this regime, the method for size reduction of the material being processed can be controlled by controlling the head loss by changing the velocity of the cyclonic fluid stream. For example, this can be achieved by changing the impellor fan speed. In the complete turbulence region, this control is not possible. Therefore, the use of viscosity modifying agents helps to ensure that the method is controllable.

Example 2

A sample of brown coal sourced from Victoria, Australia, is split into two. One batch was prepared using the apparatus described above (batch is hereinafter referred to as "Sample A"). The second batch (hereinafter referred to as "Sample B") was dried and milled using industry standard coal preparation milling method as described in ASTM D2013-07 (Standard practice for preparing coal samples for analysis).

Both the coal samples were both subjected to the following analysis:
   a) Proximate and Ultimate analyses—measuring moisture, ash, volatile matter, sulphur, chlorine, Gross Calorific value, Net Calorific Value;
   b) Size analysis;
   c) Intrinsic reactivity; and
   d) Scanning Electron microscopy-Energy Dispersive Spectrometry (SEM-EDX).

Each of the above analyses and their results will be described in detail below.

a) Proximate and Ultimate Analyses

The proximate analysis was carried out using the standard ASTM (American Society for Testing and Materials) D3172 methodology and the Ultimate analysis was carried out using ASTM D3176. The results of the proximate analysis and ultimate analysis of Samples A and B are as shown in Table 1 below. The results are typical of a low rank (brown) coal with the raw sample containing a high moisture content and low calorific value. Sample A was significantly drier than Sample B. The ash content was significantly lower for Sample A and demonstrated a higher percentage of volatile matter which is beneficial. Sample A demonstrated a significantly higher gross and net calorific value which leads to more efficient combustion, better efficiencies and also less greenhouse gas emissions from brown coal combustion.

The results of the proximate analysis and ultimate analysis are provided in Table 1.

TABLE 1

Results of the proximate and ultimate analysis

|  | Sample A | Sample B |
|---|---|---|
| Total moisture (%) | 16.9 | 44.9 |
| Ash content (%) | 7 | 9.3 |
| Volatile matter (%) | 40.4 | 26.0 |
| Sulphur content (%) | 0.46 | 0.31 |
| Chlorine content (%) | 0.05 | 0.030 |
| Gross calorific value (kJ/kg) | 21220 | 13560 |
| Net calorific value (kJ/kg) | 20802 | 12007 | b) Particle Size Analysis

The particle size analysis was carried out using a Mastersizer 2000 particle size analyser (Malvern Instruments Limited). The method used for the analysis was the General Purpose analysis model as described in the Malvern Instruments Operator's Guide.

The particle size distribution for the two samples is markedly different. Sample A was significantly finer with few particles greater than 50 μm. Both samples contained similar particle morphologies, with some elongated particles, but most particles had an aspect ratio lower than 2. Particle sizing for sample A and sample B was obtained using Malvern Laser Diffraction particle size analyzer (Malvern Instruments GmbH), the results from which are shown in FIGS. 4 and 5, respectively.

Figure 4:
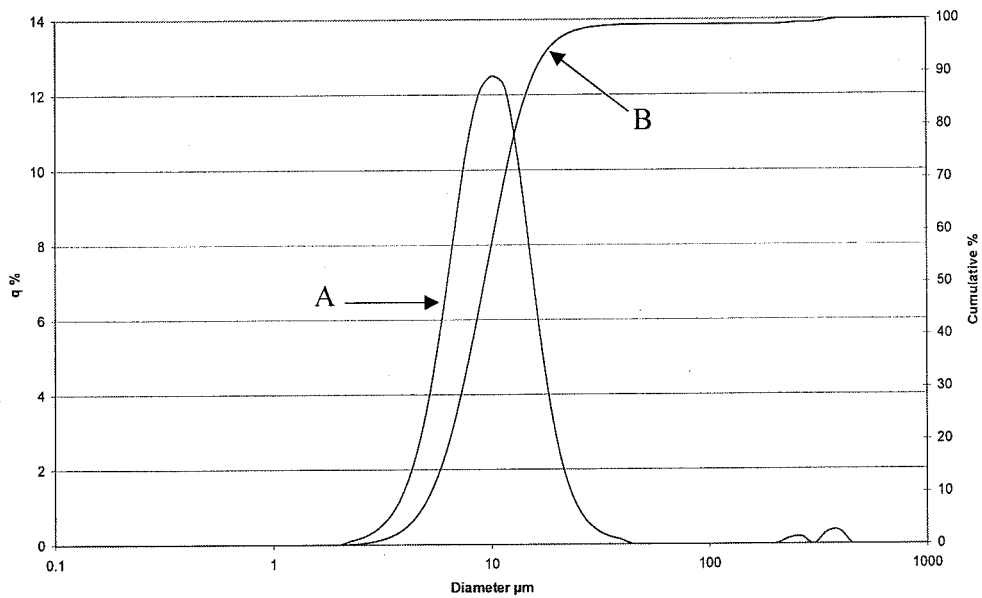
FIG. 4 shows the Malvern particle size distribution of a sample of brown coal whose size is reduced according to the apparatus of one aspect of the present invention (sample A)
Figure 5:
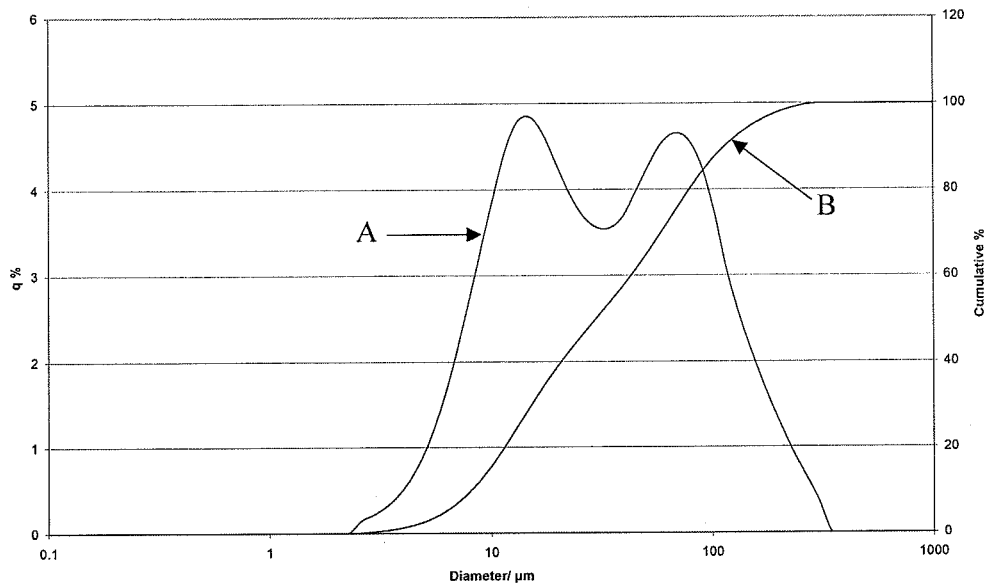
FIG. 5 shows the Malvern particle size distribution of a sample of brown coal whose size is reduced according to milling (sample B)

The difference in particle sizing is immediately apparent from the different profiles, with sample A showing a single and even distribution about a mean particle diameter of about 10 μm as seen by line "A" in FIG. 4. Sample B showed a bi-modal size distribution with peaks at about 10 μm and 70 μm as seen by line "A" in FIG. 5. Line "B" in each of FIGS. 4 and 5 refer to the cumulative percentage of material so that it can be seen how much of the material is at a particular size.

The $d_{50}$, $d_{10}$ and $d_{90}$ values are shown in Table 2 below. $d_{50}$ is defined as the median average particle size, whilst the $d_{10}$ particle size is the diameter where 10% of the particles have a smaller diameter (and hence the remaining 90% is coarser). The definition of $d_{90}$ is therefore the particle size where 90% of the particles have a smaller diameter and the remaining 10% is coarser.

TABLE 2

The $d_{50}$, $d_{10}$ and $d_{90}$ values of samples A and B.

|  | Sample A | Sample B |
|---|---|---|
| $d_{50}$ | 9 | 29 |
| $d_{10}$ | 5 | 8 |
| $d_{90}$ | 16 | 110 |

From the results obtained in Table 2, it can be seen that sample A resulted in a much smaller particle size distribution compared to sample B. Further, the average particle size of sample A was also smaller than that of sample B, indicating better processing of the sample.

c) Intrinsic Reactivity

The intrinsic reactivity is a measure of how easily coal burns by reaction with oxygen to form carbon dioxide, $CO_2$. For the purposes of the present example, this has been measured by Thermal Gravimetric Analysis (TGA). In this test, a weighed sample of coal was heated in air at a fixed rate (10° C. per minute) and the rate of weight loss was determined, yielding a curve. The TGA profiles for Samples A and B are shown in FIG. 6.

Sample A appeared to burn out faster than Sample B and yielded an unusual spike in the profile at approximately 400° C. The peak temperature and burnout temperature of sample B is notably higher than that of the sample A. The peak temperature is the temperature at which the maximum rate of weight loss occurs. The burnout temperature is the temperature at which burnout is considered virtually complete and is defined by a rate of weight loss <0.1%/min. Both peak temperature and burnout temperature will increase as reactivity decreases.

Figure 6:
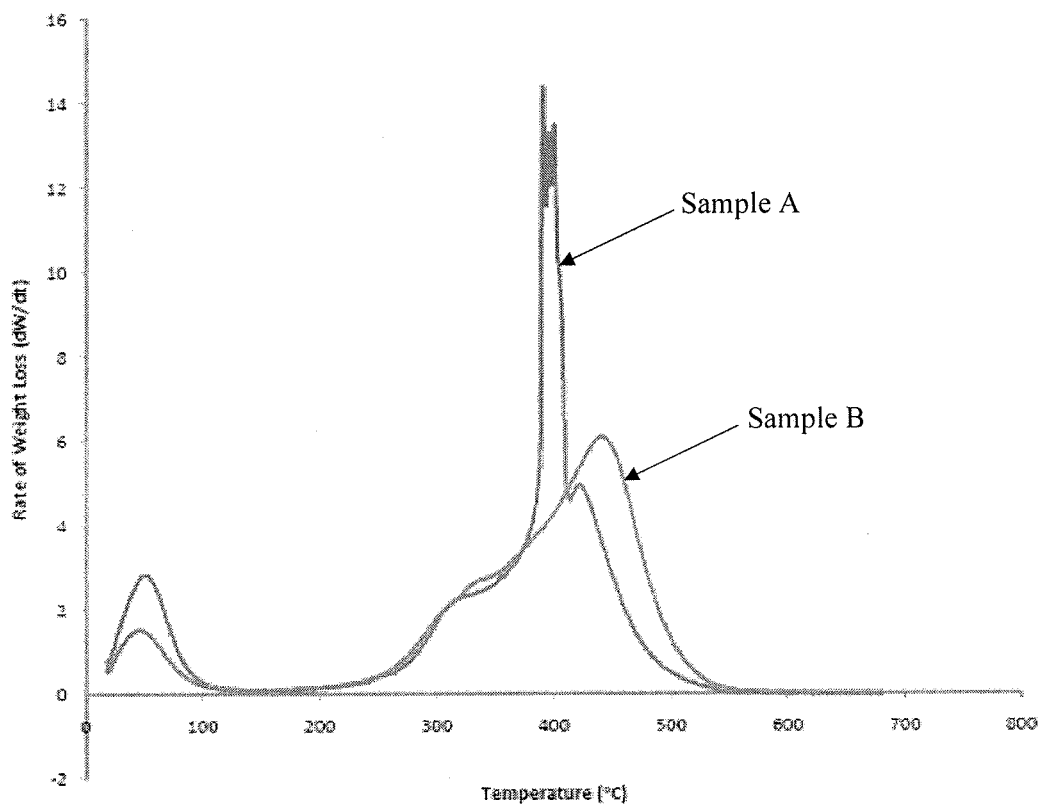
FIG. 6 shows the rate of weight loss against temperature for each of samples A and B.

Based on FIG. 6, it can be seen that sample A yields better results than sample B. It is preferable to have lower peak temperatures and burnout temperatures as it demonstrates that the coal is more reactive. Additionally, lower peak temperatures result in lower $NO_x$ emissions from coal combustion and also reduction in carbon in the ash content.

d) SEM-EDX Analysis

The ratio of carbon to oxygen was determined using the SEM-EDX analysis. SEM/EDX provides a pictorial representation of the surface with the elemental composition of the selected area. The technique is sensitive for elements to approximately 0.1 wt % and can probe depths from 0.2 to 8 mm depending on the energy of the electron beam used and the average atomic number of the sample. For the purposes of the present example, the protocol followed for the SEM-EDX analysis was as described in MJ Walzak et al, The Use of XPS, FTIR, SEM/EDX, Contact Angle, and AFM in the Characterization of Coatings, Journal of Materials Engineering and Performance, 7(3):317-323, 1998.

The results obtained are shown in Table 3 below.

TABLE 3

Results of SEM-EDX analysis

|  | Weight % | Atomic Weight % |
|---|---|---|
| Sample A average | 2.29 | 3.05 |
| Sample B average | 2.36 | 3.15 |

The weight % is on a mass basis and the atomic weight % is based on the atomic weight.

From the SEM-EDX analysis, it appears that there is a difference in carbon to oxygen ratios between the two samples which will lead to more complete combustion due to the increased ratio of oxygen.

Example 3

A sample of Bauxite material from Queensland, Australia with a moisture content of 16% was obtained. The effect of the addition of viscosity modifying agent on the sample was tested. The viscosity modifying agents chosen were heated air with a temperature of approximately 50° C. and a mist spray of water. Ambient temperature and humidity were 26° C. and 30%, respectively.

Tests were then conducted by adding heat and then repeated by adding moisture.

1. Baseline Test, no water or heat added: Moisture of the sample was reduced to 7%.

2, Heated air added to air intake: Moisture of the sample was reduced to 9%.

3. Mist spray added to air intake: Moisture of the sample was reduced to 4%.

Example 4

Lignite is composed predominantly of aromatic rings arranged to form a complex, rigid, lattice microstructure with voids that trap large molecules. Lignite has a high surface area and a high porosity that easily absorbs organic materials. It also has some aliphatic content, for example, the surface consists of paraffin waxes and chemically reactive organic species.

Humates, including humic acid, occur naturally in lignite, other coals, mosses, soils, etc. They are complex, concentrated organic acids that break down hydrocarbon materials, including hydrocarbon-oils, into smaller organic molecules such as fatty acids, amino acids and sugars by a combination of direct chemical action and catalytic microbial activity. They also display biological and pharmacological properties once they enter the food chain. These smaller molecules represent as food for indigenous oil-digesting bacteria present in the lignite and the oil. The bacteria normally multiply, however, reproduction is greatly enhanced by the presence of humates and nitrogen.

The bacteria eventually consume all the hydrocarbon materials present. However, this process is greatly enhanced by increased humate activity. The process can also be accelerated by the addition of large quantities of specific oil-degrading bacteria (such as *Enterobactor Sakazakii*) to the absorbing medium.

It is known that some bacteria are beneficial for oil remediation. However, they are more effective for remediating land on which oil has caused contamination than for marine oil spills, due to their aversion to salt water. As oil-absorbing media, such as lignite and mosses, naturally contain abundant amounts of humate, the need for additional bacteria is obviated.

It is widely acknowledged that humates can enhance the remediation of oil contamination through the process of absorption of hydrocarbons and enhanced biodegradation and decomposition. Humates are a component of the natural organic carbon cycle, they are considered environmentally benign. They initiate and enhance bioremediation by stimulating and catalysing indigenous microbial growth which consumes the hydrocarbon and converts it into beneficial aquatic and soil based nutrients. Because humates occur naturally throughout the environment, humate-based remediation has significant advantages.

Normally, oil-consuming microbes use oxygen from the water to survive, which leads to the creation of "dead zones" (dead zones are created by high concentrations of nitrogen and an absence of oxygen). However, humates flourish in the presence of nitrogen, causing oxygen to be produced during the decomposition of hydrocarbons which is then excreted into the water. Oxygen will continue to be excreted during the decomposition phase, which ultimately results in the oil being converted into sugars, fatty acids and amino acids. These substances are plant nutrients and are the final result of the decomposition process. They are then re-absorbed into the eco-system by flora and fauna.

Humate is extremely chemically reactive with hydrocarbons as the organic acids perform the function of breaking down the hard cellular wall and adhesive materials. These natural compounds are formed in nature from the internal fluid of a living cell. When the cell is starved of oxygen and dies, the internal fluid changes into organic acids. Humate is a concentrated form of these acids that is unable to differentiate between an oil hydrocarbon or the cellular structure within a plant. When these substances come into contact with each other, the acids begin the breakdown process.

Experiments were therefore conducted to examine the efficacy of lignite as a sorbent material for removing hydrocarbon-oil from water and converting it into nutrients. Additional experiments were also conducted to assess the properties of the material and its toxicity.

A sample of lignite from Victoria, Australia, is split into two. One batch was prepared from the method of the present invention as described above (this batch is hereinafter referred to as "batch A"). The second batch of lignite (hereinafter referred to as "batch B") was dried and milled using industry standard coal preparation milling method as described in ASTM D2013-07 (Standard practice for preparing coal samples for analysis).

Each of experiments (a) to (f) was carried out at room temperature and normal atmospheric pressure.

(a) Comparison of Water Solubility of Lignite 20 grams of lignite from batch A and batch B was each added to separate vessels containing 300 mL of seawater. The mixture was then agitated.

It was observed that the lignite from batch A could not be wetted both before and after agitation. Further, the lignite particles were found to float on the water surface. On the other hand, the lignite from batch B absorbed water and became went and the particles were found to flocculate and sink to the bottom of the vessel.

It can therefore be concluded that lignite which was processed using the apparatus of the present invention became hydrophobic as opposed to the lignite which was dried and milled using standard coal preparation milling methods which remained hydrophilic.

Such modified properties of the lignite of batch A could be useful for further applications. For example, the hydrophobic and modified nature of the lignite particle surfaces (which exhibit significantly higher surface charges) of batch A can efficiently remove ash from lignite. The fine ash particles exhibit differing surface charges from the fine lignite particles and can be effectively removed using electrostatic precipitators or magnetic separators, which one skilled in the art would be aware of.

The uniform particle size distribution and hydrophobic properties of lignite particles also lends itself to effective removal of the ash using standard froth flotation methods which utilise surface active surfactants. Due to the unique hydrophobic nature of the lignite particles, very small concentrations of surfactants are needed to separate the ash particles from the lignite using froth flotation methods. These methods are well known by those skilled in the art. It is also possible to use centrifugal forces to separate the ash and lignite from the mixture which would contain water and surfactants. The highly hydrophobic nature of the lignite and even size distribution as well as small particle size would enhance the removal rates of ash and recoverable amounts of lignite using these methods known to those skilled in the art.

A further example of ash separation would be to mix up the hydrophobic lignite in a water mixture in a high speed stirrer. A small amount of oil is added and the lignite will be separated into the oil phase, leaving the ash in the water phase. The lignite can then be filtered off.

(b) Comparison of Lignite as a Sorbent when Mixed with Seawater and Hydrocarbon-Oil 10 g of medium crude hydrocarbon-oil from Australia was added to two separate vessels containing 300 mL of seawater. 5 g of lignite from batch A was added into one vessel and 5 g of lignite from batch B was added into the other vessel. The mixture in each of the vessels was agitated.

It was observed that within minutes, the lignite from batch A integrated into an oily-appearance and paste-like substance. The lignite of batch A began to absorb the oil. After approximately 40 minutes, the lignite from batch A was no longer discernable from the new substance which was formed. Further, the lignite appeared to be homogeneous with the oil. After a few hours, the substance formed spherical shapes which began to break away from the oil matrix, and the spherical shapes then sank to the bottom of the vessel. Within 72 hours, the water in the vessel became clear with no oil being visibly present. The oil appeared to be encapsulated within the spherical shapes at the bottom of the vessel. When the mixture from the vessel was filtered, the spherical shapes were firm when touched. The spherical shapes did not leach oil under pressure.

On the other hand, the lignite from batch B appeared to absorb little or no oil even after several hours of agitation. Some of the particles flocculated and sank to the bottom. Oil was still visible on the surface of the seawater. When the mixture from the vessel was removed and filtered, the lignite particles from batch B did not contain oil. Further, when the lignite particles were dried, most of the particles were in the same powder form as when they were first added to the vessel, while some particles were agglomerated.

It can therefore be concluded that lignite from batch A is an effective sorbent. It removed the oil from the seawater by absorption and chemisorption. The oil was contained both within the particles of batch A and chemically bonded to the surface of the particles.

(c) Comparison of Lignite as a Sorbent when Mixed with Seawater and a Toxic Dispersant 250 mL of seawater was added to two separate vessels and mixed with 20 mL of light sweet crude oil (West Texas Intermediate Oil) to give a concentration of 80000 ppm. 1 mL of Corexit EC9527A (Nalco) was added to the mixture of seawater and oil. The vessels were then agitated. Subsequently, 15 g of lignite from batch A was added to one vessel, while 15 g of lignite from batch B was added to the other vessel. The vessels were then agitated again. After 96 hours, the mixtures in both vessels were filtered using fluid solvent extraction treatment to extract any remaining oil from the water. The oil concentration was then determined using Fourier Transform Infrared Spectroscopy (FTIR).

Corexit EC9527A was added to the water to replicate ocean spill conditions. This dispersant contains propylene glycol, 2-butoxyethanol and dioctyl sodium sulfosuccinate. 2-butoxyethanol was identified as a casual agent in the health problems experienced by workers involved with the 1989 Exxon Valdez oil spill clean up.

It was observed that the lignite from batch A began to wick and absorb the mixture within minutes. The colour of the mixture containing lignite from batch A changed to a darker colour, and subsequently into an oily-appearance. Paste-like substances then began to form. After approximately 40 minutes, the lignite from batch A was no longer discernable from the newly formed substance and appeared to be homogeneous with the mixture. Within hours, newly formed substance formed spherical shapes which began to break away from the oil matrix. These shapes sank to the bottom of the vessel. Within 96 hours, the water in the vessel became clear with no oil being visibly present. The oil appeared to be encapsulated within the shapes which had sunk to the bottom of the vessel. FTIR analysis showed the oil concentration of the mixture to be less than 500 ppm.

On the other hand, the lignite from batch B did not appear to absorb any oil even after several hours of agitation. The lignite flocculated and sank to the bottom of the vessel and oil was still apparent on the water surface. FTIR analysis showed the oil concentration of the sample to be 75000 ppm.

It can therefore be concluded that the Corexit dispersant does not inhibit the removal of oil from oil-contaminated seawater using lignite from batch A.

(d) Lignite as a Sorbent when Mixed with Seawater and a Toxic Dispersant 250 mL of seawater was added to a vessel and mixed with 20 mL of light sweet crude oil (West Texas Intermediate Oil) to give a concentration of 10000 ppm. 1 mL of Corexit EC9527A (Nalco) was added to the mixture of seawater and oil. The vessel was then agitated. Subsequently, the mixture was passed through a gravity fed filtration column containing lignite from batch A. The mixture was then collected and analysed using Fourier Transform Infrared Spectroscopy (FTIR).

It was observed that the lignite from batch A began to wick and absorb the mixture within minutes. Paste-like substances then began to form. After approximately 40 minutes, the lignite from batch A was no longer discernable from the newly formed substance and appeared to be homogeneous with the mixture. Within hours, the newly formed substance formed spherical shapes which began to break away from the oil matrix. These shapes sank to the bottom of the vessel. Within 96 hours, the water in the vessel became clear with no oil being visibly present. The oil appeared to be encapsulated within the shapes which had sunk to the bottom of the vessel. FTIR analysis showed the oil concentration of the mixture to be less than 2 ppm.

This experiment confirmed the previous finding that Corexit dispersant could be removed together with oil from oil-contaminated seawater using lignite processed from the apparatus and/or method of the present invention.

(e) Assessment of Surface and Pore Characteristics of Lignite to Adsorb Volatile Organic Compounds (VOCs) Found in Crude Oil A major concern for workers when in close proximity to oil-spill areas is exposure to VOCs. Crude oil contains VOCs such as benzene, xylene and toluene. These VOCs evaporate readily. However, exposure to them can cause reductions in the red and white blood cell counts, headaches, nausea, ophthalmic disorders and neurological side effects. There is an established link between benzene exposure and leukaemia. Crude oil can contain between 0.3% and 1% of benzene.

Lignite from batch A and batch B was added to separate flasks containing seawater, Corexit EC9527A (Nalco) and a light sweet crude oil (West Texas Intermediate Oil). The mixture in each flask was then mixed using a magnetic stirrer. Air was then bubbled into the mixtures to release the VOCs from the oil. The VOCs were then allowed to be adsorbed into a carbon sample tube containing activated charcoal and analysed by gas chromatography. Both carbon sample tubes were then desorbed using hexane and analysed by gas chromatography. The concentration of the VOC was calculated using the peak areas at laboratory standards.

It was observed that within 90 minutes, the benzene level in the mixture comprising lignite from batch A demonstrated a repeatable reduction of VOCs in the range of 93-95% over the mixture comprising lignite from batch B.

(f) Effect of Humates Containing within Lignite on Hydrocarbon-Oil Upon Adsorption Lignite from batch A and batch B was added to separate flasks containing seawater, and a sweet light crude oil (West Texas Intermediate Oil). The mixture in each flask was then agitated for 3 minutes. The resulting paste was then added to sea floor sediment. Each paste was then tested for hydrocarbon content to determine the total amount of recoverable petroleum hydrocarbon contamination using a turbidimetric method calibrated with a blank and a single calibration standard. The hydrocarbon content in both pastes was determined to be 2000 ppm. The pastes were then left to stand for 35 days before being analysed again.

It was observed that the total amount of recoverable petroleum hydrocarbon contamination in the paste containing lignite from batch A was determined to be 183 ppm, while that in the paste containing lignite from batch B was determined to be 1150 ppm.

It can therefore be concluded that lignite from batch A demonstrates an unexpected capacity to reduce fractions of hydrocarbons by direct chemical action, microbial stimulation and catalytic action. It appears to significantly accelerate the natural process of decomposing hydrocarbons and hydrocarbon-oils.

From the above experiments (a) to (f), it can be seen that when organic lignite is subjected to the method according to any aspect of the present invention, the molecular structure of the lignite is altered and the particle surface characteristics are modified. In particular, the normally highly reactive, hydrocarbon-rich surfaces of lignite are converted to be more carbonaceous with improved properties which attract, absorb and consume hydrocarbons and hydrocarbon-oils at an extraordinary rate. The lignite also becomes activated due to the high percentage of moisture removed during the method of size reduction. Further, the normally hydrophilic lignite forms hydrophobic, high surface area particulates. The hydrophobic lignite is also oleophilic, in that the lignite has a much greater affinity for oils and an immense propensity to absorb hydrocarbons and to repel water.

Lignite particles, which have undergone the method of the present invention, would result in a lower moisture content resulting from water removal from the particles during the method. As a result of the water removal, the lignite's cavernous pore structure becomes enlarged. This causes the surface chemistry to become enhanced and the larger surface area causes the lignite to absorb hydrocarbons rapidly on contact by wicking action. The processed lignite particles encapsulate oil with high retention, so much so that it cannot be leached, even by compression.

As a result of the process which the lignite particles undergo when the particles are subjected to the method of the present invention is that an oxidation reaction occurs causing a rapid increase in the amount of humates present in the lignite. The primary function of humates causes degradation of organic matter, chelating of metals and catalyzing microbial activity.

Further, lignite subjected to the method of the present invention are useful for removing heavy metals such as lead, cadmium, chromium, cobalt, manganese, nickel, copper, zinc, amongst others, as well as radionuclides such as cerium, cesium, uranium and strontium.

CONCLUSION

It has been demonstrated that the addition of a viscosity modifying agent results in the material to be reduced much better and with a much narrower particle size distribution. It has also been demonstrated that adding water as a viscosity modifying agent to the material whose size is to be reduced during the process of size reduction results unexpectedly and counter-intuitively, in a dryer product.

These effects may be explained in terms of improved flow conditions within the cyclone chamber as a result of the addition of viscosity modifying agents that are capable of modifying the kinematic viscosity of the fluid within the cyclone chamber. The consequent optimisation of the Reynolds number allows an increase in the residence time of the material whose size is to be reduced in the cyclone vortex and subsequently allows more exposure to the shear forces which fracture the material and thereby reducing their size and releasing more trapped moisture.

Further, ionisation of the main components of humid air is known to produce a range of free radicals and reactive gaseous species including ozone and hydrogen peroxide. Large electric fields produced in wind-blown sand and dust storms produce energetic electrons that catalyze the production of hydrogen peroxide and ozone, both strong oxidants, from moist air.

There is no previous mention of the triboelectric charging of particles in the prior art associated with vortex-based processing systems. Furthermore, there is no mention of harnessing and controlling this effect to improve the properties of the material being processed in the cyclone chamber.

Plasmas are highly reactive chemical environments and both the hydrogen peroxide and ozone formed as a result of triboelectric charging and the subsequent ionisation of air and water vapour can be used to chemically modify the surface of the particles being processed in the cyclone chamber. Furthermore, optimising the Reynolds number can also be used in controlling the ionisation of the air and water vapour. Reactive or nonreactive gases may also be introduced into the cyclone chamber.

For example, the properties of lignite coal are beneficially altered when processed using the apparatus and/or method as described in any embodiment above. Lignite is normally very hydrophilic but when it is subjected to the size reduction according to the method and/or apparatus according to any aspect of the present invention, the end product of the lignite becomes very hydrophobic, which is the desired state for facilitating further processing in the energy industry. Also, the same material, normally prone to spontaneous combustion is rendered inert and requires an ignition source to ignite after being processed by the apparatus of any aspect of the present invention.

What is claimed is:

1. A method for size reduction of a material, the method comprising the steps of:
feeding material through a feed assembly into a cyclone chamber, the cyclone chamber having an elongate cylindrical conduit having a frusto-conical section;
adding at least one viscosity modifying agent into the cyclone chamber; and
providing a cyclonic fluid stream within the cyclone chamber,
wherein the cyclonic fluid stream has a kinematic viscosity (v) of $1\times10^{-8}$ m$^2$/s$\leq$v$\leq$$1\times10^{-1}$ m$^2$/s.

2. The method according to claim 1, wherein the viscosity modifying agent is a kinematic viscosity modifying agent.

3. The method according to claim 1, wherein the ratio of the volume of material fed into the feed assembly to the volume of air within the cyclone chamber is $\leq$40%.

4. The method according to claim 1, wherein the cyclonic fluid stream is provided by a device, the device being located in an opening formed at the termination of the frusto-conical section of the cyclone chamber.

5. The method according to claim 1, wherein the material whose size has been reduced has an average particle size of 5 nm-150 μm.

6. The method according to claim 1, wherein the method is carried out in an apparatus comprising:
a cyclone chamber having an elongate cylindrical conduit having a frusto-conical section;
a device for creating a cyclonic fluid stream within the cyclone chamber, such that the frusto-conical section of the cyclone chamber terminates in an opening forming the inlet to the device;
an air inlet tube in fluid connection with the cyclone chamber at the opposite end of the frusto-conical section; and
a feed assembly for feeding material into the cyclone chamber.

7. The method according to claim 6, wherein the length of the air inlet tube is 200-240% of the diameter of the device.

8. The method according to claim 6, wherein the width of the air inlet tube is approximately 33% of the diameter of the device.

9. The method according to claim 6, wherein the length of the cyclone chamber is 65-85% of the length of the air inlet tube.

10. The method according to claim 6, wherein the width of the device is one third the diameter of the device.

11. The method according to claim 6, further comprising a computer control system for controlling amount of material, air, and viscosity modifying agent within the cyclone chamber.

12. The method according to claim 6, wherein the ratio of diameter of the feed assembly to diameter of the air inlet tube is 0.3-0.5.

13. The method according to claim 1, wherein the step of adding at least one viscosity modifying agent into the cyclone chamber is carried out when the kinematic viscosity (v) of the cyclonic fluid stream within the cyclone chamber is outside the range of $1\times10^{-8}$ m$^2$/s$\leq$v$\leq$$1\times10^{-1}$ m$^2$/s.

* * * * *